United States Patent
Boccardi et al.

(10) Patent No.: US 9,319,116 B2
(45) Date of Patent: Apr. 19, 2016

(54) CHANNEL STATE INFORMATION FEEDBACK

(75) Inventors: Federico Boccardi, Cavour (IT);
Thorsten Wild, Stuttgart (DE)

(73) Assignee: Alcatel-Lucent, Boulogne-Billancourt (FR)

(*) Notice: Subject to any disclaimer, the term of this patent is extended or adjusted under 35 U.S.C. 154(b) by 272 days.

(21) Appl. No.: 13/520,848

(22) PCT Filed: Jan. 6, 2011

(86) PCT No.: PCT/EP2011/000020
§ 371 (c)(1),
(2), (4) Date: May 3, 2013

(87) PCT Pub. No.: WO2011/083081
PCT Pub. Date: Jul. 14, 2011

(65) Prior Publication Data
US 2013/0223551 A1    Aug. 29, 2013

(30) Foreign Application Priority Data
Jan. 8, 2010 (EP) ................................. 10360001

(51) Int. Cl.
*H04B 7/06* (2006.01)
*H04B 7/04* (2006.01)
(Continued)

(52) U.S. Cl.
CPC ............ *H04B 7/0417* (2013.01); *H04B 7/0626* (2013.01); *H04B 7/0663* (2013.01); *H04L 1/0618* (2013.01); *H04L 25/03343* (2013.01); *H04L 2025/03808* (2013.01)

(58) Field of Classification Search
CPC ...... H04B 1/0483; H04L 1/06; H04L 1/0618; H04L 25/03057
See application file for complete search history.

(56) References Cited

U.S. PATENT DOCUMENTS 7,515,714 B2    4/2009   Orihashi et al.
8,565,064 B2 *  10/2013  Tang et al. .................. 370/208
(Continued)

FOREIGN PATENT DOCUMENTS

CN    1303558 A    7/2001
CN    1809048 A    7/2006
(Continued)

OTHER PUBLICATIONS

Benvenuto et al ("Joint Low-Rate Feedback and Channel Quantization for the MIMO Broadcast Channel," AFRICON 2007, XP031189623, pp. 1-7, Sep. 1, 2007).*
(Continued)

*Primary Examiner* — Leon-Viet Nguyen
(74) *Attorney, Agent, or Firm* — Fay Sharpe LLP (57) ABSTRACT

An apparatus and method for feeding back channel state information is disclosed. The method is for providing channel state information for a wireless communications channel provided between a first network node having at least one transmission antenna and a second network node having at least one reception antenna. The method comprises the steps of: determining characteristics of each tap resolvable in the time domain of at least one sub-channel within said channel from signals received by said at least one reception antenna over said channel from said at least one transmission antenna; arranging said characteristics into at least one vector; quantizing said at least one vector by selecting one of a plurality of codebook vectors at a first level of a hierarchical codebook of vectors; and providing, to said first network node, an indication of an index to said one of a plurality of codebook vectors.

17 Claims, 4 Drawing Sheets

(51) Int. Cl.
*H04L 1/06* (2006.01)
*H04L 25/03* (2006.01)

(56) References Cited

U.S. PATENT DOCUMENTS

| | | | |
|---|---|---|---|
| 2005/0111539 A1* | 5/2005 | Tsuchiya | 375/229 |
| 2008/0130764 A1 | 6/2008 | Xia et al. | |
| 2008/0299917 A1* | 12/2008 | Alexiou et al. | 455/103 |
| 2009/0323618 A1 | 12/2009 | Wild | |
| 2013/0223551 A1 | 8/2013 | Boccardi et al. | |

FOREIGN PATENT DOCUMENTS

| | | |
|---|---|---|
| CN | 101267421 A | 9/2008 |
| EP | 2 139 124 A1 | 12/2009 |
| JP | 2004-032679 A | 1/2004 |
| JP | 2007-251924 | 9/2007 |
| JP | 2009-033744 A | 2/2009 |
| JP | 2013-516878 A | 5/2013 |
| WO | WO-2009/011652 | 1/2009 |
| WO | WO 2009-156319 A1 | 12/2009 |

OTHER PUBLICATIONS

Benvenuto et al., "Joint Low-Rate Feedback and Channel Quantization for the MIMO Broadcast Channel," AFRICON 2007, XP031189623, pp. 1-7, Sep. 1, 2007.

Boccardi et al., "Hierarchical Quantization and Its Application to Multiuser Eigenmode Transmissions for MIMO Broadcast Channels with Limited Feedback," IEEE International Symposium on Personal, Indoor and Mobile Radio Communications, XP031168826, pp. 1-5, Sep. 1, 2007.

Huang et al., "A Limited Feedback Precoding System with Hierarchical Codebook and Linear Receiver," IEEE Transactions on Wireless Communications, vol. 7, No. 12, XP011239942, pp. 4843-4848, Dec. 1, 2008.

Alcatel Lucent, "CQI and CSI Feedback Compression," $3^{rd}$ Generation Partnership Project (3GPP), 3GPP TSG RAN WG1 #57, R1-092032, XP050339500, pp. 1-3, San Francisco, USA, May 4-8, 2009.

International Search Report for PCT/EP2011/000020 dated Apr. 7, 2011.

N. Benvenuto, et al., "Joint Low-Rate Feedback and Channel Quantization for the MIMO Broadcast Channel," IEEE, 2007.

F. Boccardi, et al., "Hierarchical Quantization and its Application to Multiuser Eigenmode Transmissions for MIMO Broadcast Channels with Limited Feedback," The $18^{th}$ Annual IEEE International Symposium on Personal, Inddor and Mobile Radio Communications, 2007.

Y. Huang, "A Limited Feedback Precoding System with Hierarchical Codebook and Linear Receiver," IEEE Transactions on Wireless Communications, vol. 7, No. 12, Dec. 2008.

Alcatel-Lucent, Alcatel-Lucent Shanghai Bell, "Signalling Aspects of Adaptable Codebooks," 3GPP TSG RAN WG1 #58bis, R1-093776, Oct. 5, 2009.

Matted Trivellato, "On transceiver design and channel quantization for downlink multiuser MIMO systems with limited feedback," IEEE Journal on Selected Areas in Communications, vol. 26, No. 8, Oct. 2008, pp. 1494-1504.

N. Benvenuto, excerpts of book entitled "Algorithms for Communications Systems and their Applications," 2002, 17 pp., John Wiley & Sons, Ltd.

* cited by examiner

FIG. 1

FIG. 2A CHANNEL IMPULSE RESPONSE AMPLITUDES FOR EACH ANTENNA TO ANTENNA LINK (SUB-CHANNEL)

FIG. 2B POWER DELAY PROFILE AVERAGED OVER TIME AND ANTENNAS

CHANNEL STATE INFORMATION FEEDBACK

BACKGROUND

The present invention relates to an apparatus and method for feeding back channel state information.

FIELD OF THE INVENTION

Base stations in wireless communication systems provide wireless connectivity to user equipment within the geographic area, or cell, associated with the base station. The wireless communication links between the base station and each of the user equipment typically include one or more downlink (or forward) channels for transmitting information from the base station to the user equipment and one or more uplink (or reverse) channels for transmitting information from the user equipment to the base station. Multiple-input-multiple-output (MIMO) techniques may be employed when the base station and, optionally, the user equipment include multiple antennas. For example, a base station that includes multiple antennas can transmit multiple independent and distinct signals to multiple user equipment concurrently and on the same frequency band.

For example, consider a cellular system with M antennas at the base station and N antennas at the user equipment. In such communication systems, the radio channel between the base station and the user equipment can be described in terms of N×M links (sub-channels). Each link typically has a time-varying complex gain (i.e. amplitude and phase). If the radio channel is wideband (i.e. symbol rate greater than the delay spread of the channel), the complex gain varies across the bandwidth of the transmitted signal. The overall state of the radio channel can therefore be described as a series of complex weights. This channel state information is measured by the user equipment and fed back to the base station in order to allow the base station to adapt characteristics of the signals transmitted to the user equipment to match it in the most appropriate way to the prevailing channel state.

Although techniques exist to provide channel state information feedback, they each have their own shortcomings. Accordingly, it is desired to provide an improved technique for providing channel state information.

SUMMARY

According to a first aspect, there is provided a method of providing channel state information for a wireless communications channel provided between a first network node having at least one transmission antenna and a second network node having at least one reception antenna, the method comprising the steps of: determining characteristics of each tap resolvable in the time domain of at least one sub-channel within the channel from signals received by the at least one reception antenna over the channel from the at least one of transmission antenna; arranging the characteristics into at least one vector; quantising the at least one vector by selecting one of a plurality of codebook vectors at a first level of a hierarchical codebook of vectors; and providing, to the first network node, an indication of an index to the one of a plurality of codebook vectors.

The first aspect recognises that increasing the accuracy of the channel state information fed back increases the signalling overhead and there is therefore a trade-off between accuracy of the channel state information fed back and the feed back overhead. The first aspect also recognises that by determining the time domain response characteristics of at least one sub channel, it is possible to provide information relating to the dominant aspects of those time domain characteristics by identifying the dominant taps (i.e. the primary and any secondary or reflected signals) and transmit information relating to those taps (such as their timing, amplitude and phase) which would provide the first network node with sufficient information to adapt its transmissions without needing to send less important information relating to the time domain response characteristic. With that information it is possible to adapt the transmissions made by the first network node.

Accordingly, the characteristics of each tap resolvable in the time domain of at least one sub channel within the channel are determined from signals received by the reception antennas. Hence, not all characteristics of the received signal need be determined. These taps may for example be identified in that they exceed some predetermined signal threshold, as well as being separated sufficiently in time to enable the taps to be distinguishable). The characteristics of the resolvable taps are then arranged into at least one vector. Arranging the characteristics into this vector provides for an efficient grouping without which the benefits of the subsequent quantisation steps would be difficult to achieve. The subsequent vector or vectors are then quantised using a hierarchical codebook of vectors. It will be appreciated that such a hierarchical codebook of vectors provides a number of codebook vectors at each level of the hierarchical codebook, each of which is selectable based on predetermined criteria such as, for example, that codebook vector being, for example, the closest match to the vector to be quantised, the best match to that vector or offering the minimum error, although it will also be appreciated that other selection criteria may be applied since using a hierarchical codebook enables subsequent refinement to further codebook vectors which may better represent the vector being quantised. An index to the selected codebook vector may then be provided to the first network node. Hence, rather than transmitting the selected vector itself, only the index to that vector need be provided, which it will be appreciated will be typically representable with a smaller number of bits. The first network node, which also has a copy of the codebook of vectors, can then identify the selected vector and utilise that vector to determine approximate characteristics of each tap resolvable in the time domain of each sub-channel from that codebook vector and adapt its transmissions accordingly. Hence, it can be seen that the amount of channel state feedback information provided can be drastically reduced through the combination of only identifying characteristics of each resolvable tap and by utilising a hierarchical codebook to quantise those characteristics, which is possible because of the arrangement of those characteristics into a vector. Such an approach enables a sufficiently accurate indication of the channel state information to be provided to the first network node whilst minimising the amount of information to be fed back.

In one embodiment, the step of quantising comprises: quantising the at least one vector by selecting, for each vector, one of a plurality of codebook vectors at a first level from one of a plurality of hierarchical codebooks of vectors. Accordingly, a different codebook may be provided for each vector being quantised. It will be appreciated that this enables a suitable codebook to be selected for each vector.

In one embodiment, the method comprises the steps of: requantising the at least one vector by selecting one of a plurality of hierarchically-related codebook vectors from hierarchically-related levels of the hierarchical codebook of vectors; and providing, to the first network node, an indication of an index to the one of a plurality of hierarchically-related codebook vectors. Accordingly, the quantisation of the vector may be successively refined by selecting codebook vectors which are related to the vector whose index has been previously advised to the first base station. This successive refinement enables an improved indication of the channel state information to be provided back to the first network node over time.

In one embodiment, the one of a plurality of hierarchically-related codebook vectors from hierarchically-related levels of the hierarchical codebook of vectors comprises one of a plurality of child codebook vectors from child levels of the hierarchical codebook. Accordingly, for vectors which change slowly over time, subsequent refinements in their quantisation may be possible by selecting child codebook vectors of the codebook vector previously indicated to the first network node. Such child codebook vectors are typically closer refinements of the previously advised parent codebook vector.

In one embodiment, the one of a plurality of hierarchically-related codebook vectors from hierarchically-related levels of the hierarchical codebook of vectors comprises one of a plurality of parent codebook vectors from parent levels of the hierarchical codebook. Hence, for more rapidly time varying characteristics, it may be necessary to traverse to parent levels of the hierarchical codebook to select a more appropriate codebook vector which quantises the vector.

In one embodiment, the method comprises the step of: pre-processing the at least one vector prior to the step of quantising.

In one embodiment, the method comprises the step of: when the pre-processing comprises normalising, quantising at least one scalar value produced by the step of normalising and providing, to the first network node, an indication of the at least one scalar. Accordingly, the efficiency of the quantisation process can be further improved by normalising the vectors prior to performing the quantisation. Also, as well as quantising the normalised vectors, a scalar produced during the normalising process will also need to be quantised, which may also be achieved through a hierarchical codebook or by any other appropriate process.

In one embodiment, the step of determining comprises: determining characteristics of each tap resolvable in the time domain of at least one sub-channel within the channel from signals received by the at least one reception antenna over the channel from the at least one transmission antennas by comparing signals received over time on at least one sub-channel with a predetermined threshold. It will be appreciated that other techniques may be utilised to determine the time domain characteristics of each resolvable tap.

In one embodiment, the first network node comprises at least M transmission antennas, the second network node comprises at least N reception antennas and the step of determining comprises: determining characteristics of L taps resolvable in the time domain of each sub-channel within the channel from signals received by the at least N reception antennas over the channel from the at least M transmission antennas, where L is a positive integer.

In one embodiment, the step of arranging comprises: arranging the characteristics of the L taps resolvable in the time domain of each sub-channel within the channel into vectors of characteristics for each of the at least N reception antennas at each tap, each vector having a dimension of 1×M.

In one embodiment, the step of arranging comprises: arranging the characteristics of the L taps resolvable in the time domain of each sub-channel within the channel into vectors of characteristics for each of the at least M transmission antennas at each tap, each vector having a dimension of 1×N.

In one embodiment, the step of arranging comprises: arranging the characteristics of the L taps resolvable in the time domain of each sub-channel within the channel into a concatenation of N vectors of characteristics for each of the at least N reception antennas at each tap, each of the N vectors having a dimension of 1×M.

In one embodiment, the step of arranging comprises: arranging the characteristics of the L taps resolvable in the time domain of each sub-channel within the channel into a concatenation of M vectors of characteristics for each of the at least M transmission antennas at each tap, each of the M vectors having a dimension of 1×N.

In one embodiment, the step of arranging comprises: arranging the characteristics of the L taps resolvable in the time domain of each sub-channel within the channel into vectors of characteristics for each of the at least M transmission antennas and each of the at least N reception antennas, each vector having a dimension of 1×L.

In one embodiment, the network node comprises more than M transmission antennas and the M transmission antennas are selected from the more than M transmission antennas, either by the first network node which signals the result of the selection to the second network node, or by the second network node which signals the result of the selection to the first network node.

In one embodiment, the second network node comprises more than N reception antennas and the N reception antennas are selected from the more than N reception antennas, either by the first network node which signals the result of the selection to the second network node, or by the second network node which signals the result of the selection to the first network node.

According to a second aspect, there is provided a computer program product operable, when executed on a computer, to perform the method steps of the first aspect.

According to a third aspect, there is provided a network node having at least one reception antenna and operable to provide channel state information for a wireless communications channel provided between a another network node having at least one transmission antenna and the network node, the network node comprising: determination logic operable to determine characteristics of each tap resolvable in the time domain of at least one sub-channel within the channel from signals received by the at least one reception antenna over the channel from the at least one transmission antenna; arrangement logic operable to arrange the characteristics into at least one vector; quantisation logic operable to quantise the at least one vector by selecting one of a plurality of codebook vectors at a first level of a hierarchical codebook of vectors; and provision logic operable to provide, to the another network node, an indication of an index to the one of a plurality of codebook vectors.

In one embodiment, the quantising logic is operable to quantise the at least one vector by selecting, for each vector, one of a plurality of codebook vectors at a first level from one of a plurality of hierarchical codebooks of vectors.

In one embodiment, the quantising logic is operable to requantise the at least one vector by selecting one of a plurality of hierarchically-related codebook vectors from hierarchically-related levels of the hierarchical codebook of vectors; and the providing logic is operable to provide, to the first network node, an indication of an index to the one of a plurality of hierarchically-related codebook vectors.

In one embodiment, the one of a plurality of hierarchically-related codebook vectors from hierarchically-related levels of the hierarchical codebook of vectors comprises one of a plurality of child codebook vectors from child levels of the hierarchical codebook.

In one embodiment, the one of a plurality of hierarchically-related codebook vectors from hierarchically-related levels of the hierarchical codebook of vectors comprises one of a plurality of parent codebook vectors from parent levels of the hierarchical codebook.

In one embodiment, the quantisation logic is operable to pre-process the at least one vector prior to quantising.

In one embodiment, the quantisation logic is operable, when the pre-process comprises normalising, to quantise at least one scalar value produced by the step of normalising and the provision logic is operable to provide, to the first network node, an indication of the at least one scalar.

In one embodiment, the determination logic is operable to determine characteristics of each tap resolvable in the time domain of at least one sub-channel within the channel from signals received by the at least one reception antenna over the channel from the at least one transmission antennas by comparing signals received over time on at least one sub-channel with a predetermined threshold.

In one embodiment, the first network node comprises at least M transmission antennas, the second network node comprises at least N reception antennas and the determination logic is operable to determine time of L taps resolvable in the time domain of each sub-channel within the channel from signals received by the at least N reception antennas over the channel from the at least M transmission antennas, where L is a positive integer.

In one embodiment, the arrangement logic is operable to arrange the characteristics of the L taps resolvable in the time domain of each sub-channel within the channel into vectors of characteristics for each of the at least N reception antennas at each tap, each vector having a dimension of 1×M.

In one embodiment, the arrangement logic is operable to arrange the characteristics of the L taps resolvable in the time domain of each sub-channel within the channel into vectors of characteristics for each of the at least M transmission antennas at each tap, each vector having a dimension of 1×N.

In one embodiment, the arrangement logic is operable to arrange the characteristics of the L taps resolvable in the time domain of each sub-channel within the channel into a concatenation of N vectors of characteristics for each of the at least N reception antennas at each tap, each of the N vectors having a dimension of 1×M.

In one embodiment, the arrangement logic is operable to arrange the characteristics of the L taps resolvable in the time domain of each sub-channel within the channel into a concatenation of M vectors of characteristics for each of the at least M transmission antennas at each tap, each of the M vectors having a dimension of 1×N.

In one embodiment, the arrangement logic is operable to arrange the characteristics of the L taps resolvable in the time domain of each sub-channel within the channel into vectors of characteristics for each of the at least M transmission antennas and each of the at least N reception antennas, each vector having a dimension of 1×L.

In one embodiment, the first network node comprises more than M transmission antennas and the M transmission antennas are selected from the more than M transmission antennas, either by the first network node which signals the result of the selection to the second network node, or by the second network node which signals the result of the selection to the first network node.

In one embodiment, the second network node comprises more than N reception antennas and the N reception antennas are selected from the more than N reception antennas, either by the first network node which signals the result of the selection to the second network node, or by the second network node which signals the result of the selection to the first network node.

Through this approach it can be seen that the accuracy of the channel state information feedback can to be improved for a given feedback overhead, or the feedback overhead can be reduced for a given accuracy.

Further particular and preferred aspects are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings, in which.

DESCRIPTION OF THE EMBODIMENTS

Overview

Figure 1:
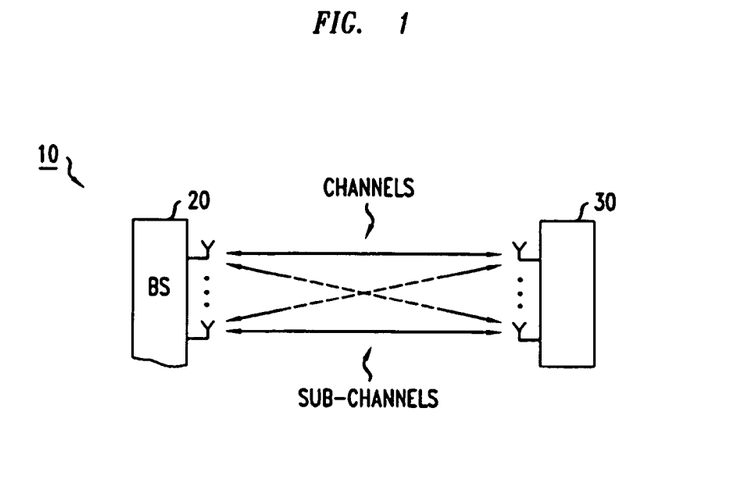
FIG. 1 illustrates the main components of a wireless telecommunications network according to one embodiment.

FIG. 1 illustrates an arrangement of a base station 20 and user equipment 30 of a wireless telecommunications network, generally 10, according to one embodiment. The base station 20 and the user equipment 30 are examples of the first and second network nodes although it will be appreciated that other examples of network nodes to which the present technique may be applied exist and indeed the functionality of the base station and user equipment may be reversed. Although just one base station and user equipment is shown for sake of clarity, it will be appreciated that many such base stations and user equipment may be deployed in such a wireless telecommunications network. Each base station 20 is provided with M antennas, whilst each user equipment 30 is provided with N antennas. Typically, at least one of M and N is an integer value greater than 1. A MIMO radio channel is established between the base station 20 and the user equipment and sub-channels are provided between each antenna of the base station 20 and user equipment 30. As will be explained in more detail below, each sub-channel will have a number of taps which represent the various signal paths between any one antenna of the base station 20 and user equipment 30. Typically, a first tap will exist which may be the direct path between these antennas. Subsequent taps exist which are typically the secondary or reflected paths between these antennas. It will be appreciated that a transmitted signal may be decodable from any one or more of these taps or a combination thereof.

Each base station 20 comprises at least one processing means adapted to receive an indication of an index to at least one hierarchical codebook from which channel state information can then be derived, and means to adjust its transmissions based on this channel state information.

Each user equipment 30 comprises the functionality of a mobile terminal for transmission and reception of signals in a network using radio transmission. Furthermore, the user equipment 30 comprises at least one processing means adapted to determine the at least one channel impulse response in the time domain for at least one sub-channel between an antenna of the base station 20 and an antenna of the user equipment 30, compare the power of said at least one channel impulse response with a predefined threshold to identify the taps, and determine only the at least one complex coefficient related to one or more time intervals of the at least one channel impulse response with a power higher than said predefined threshold, i.e. the coefficients of each of the resolvable taps. The user equipment 30 also includes means for arranging these complex coefficients into one or more vectors, means for quantising these vectors using at least one hierarchical codebook and means for signalling an index identifying the vector selected from the hierarchical codebook to the base station.

The combination of identifying the coefficients of the resolvable taps, arranging those coefficients into vectors and quantising those vectors using a hierarchical codebook to identify an index for transmission to the base station provides a particularly efficient technique to providing channel state information.

Tap Characteristic Determination

The base-band channel time domain response representation for the link between the $m^{th}$ base station transmission antenna of the M antennas and the $n^{th}$ user equipment reception antenna of the N antennas of a generic user is denoted as:

$$h_{mn}(t) = \sum_{\delta \in \Delta_{mn}} h_{mn}(t-\delta), m=1, \ldots, M$$

where $\Delta_{nm} = \{\delta_1^{nm}, \ldots, \delta_L^{nm}\}$ denotes the set of resolvable paths for this link. Such a base-band channel time domain response representation for example sub-channels is derivable by the user equipment 30 and illustrated graphically in FIG. 2C, as will be explained in more detail below.

In the following example it is assumed $|\Delta_{nm}|=L \ \forall \ n,m$; in other words it is assumed that the number of resolvable paths is the same for the different links and that the timing of the taps is the same for each sub-channel.

The base station 20 sends data and pilot signals in the downlink over each of the sub-channels. The user equipment 30 receives the data and pilots and performs channel estimation preferably using the pilots, which results in a so-called channel transfer function (CTF) per antenna-to-antenna link, i.e. for each sub-channel, and per subcarrier.

In this example, by means of an inverse fast Fourier transformation (IFFT) performed in the user equipment 30, the channel transfer function (CTF) can be transferred from the frequency domain into the time domain resulting in a channel impulse response (CIR) for each antenna-to-antenna-link. However, it will be appreciated that other techniques may be used to derive this time domain information.

Figure 2A:
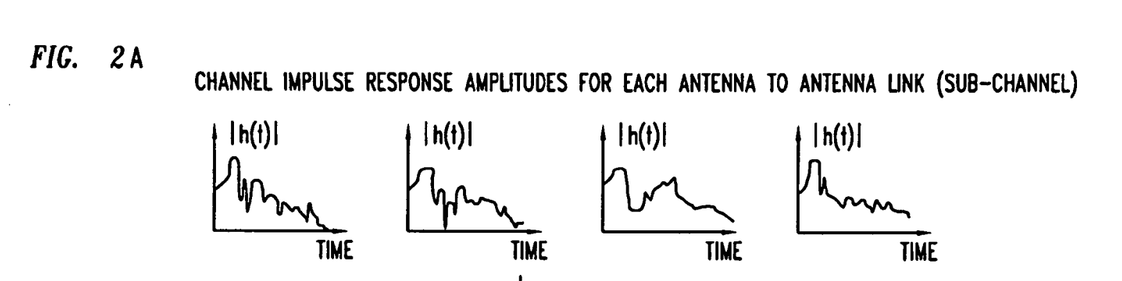
FIGS. 2A to 2C illustrate a technique for determining tap characteristics.

In FIG. 2A, the amplitudes of the channel impulse response over time are depicted for each antenna-to-antenna link, i.e. for each sub-channel. In this example, a path profiling procedure performed in the user equipment 30 similar to the procedure performed in Rake receivers is used to identify the most significant taps of the sub-channel impulse response i.e. the taps which have the strongest power, although other techniques may be used. The amplitudes of the channel impulse response of each single antenna-to-antenna link are time-averaged, and the taps which have the strongest power are identified.

Figure 2B:
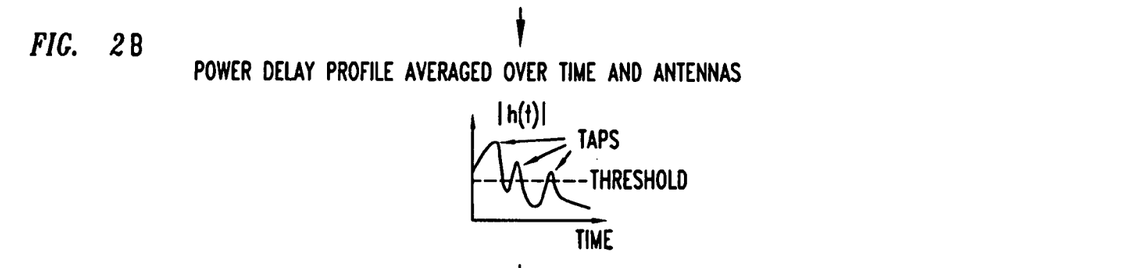
Figure 2C:
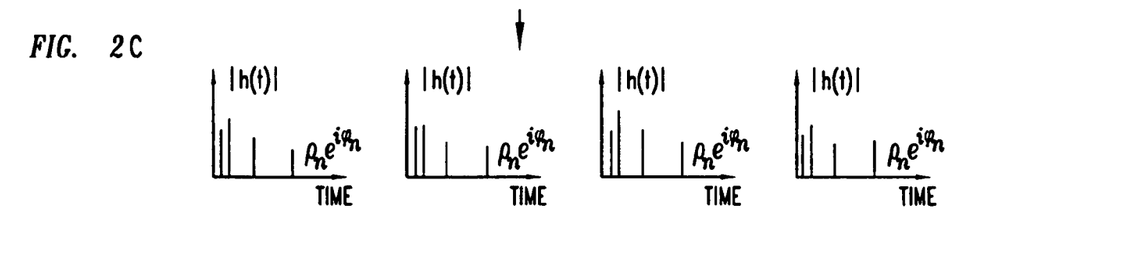

Path profiling is realized by averaging the absolute values, i.e. the amplitudes, of the channel impulse response both over time and over all antenna-to-antenna links using a low pass filter, e.g. a first order infinite impulse response filter. The averaging over time or antenna-to-antenna-links results in a channel impulse response that is free from fast fading components and is called a power delay profile. Such a power delay profile, i.e. channel impulse response, that is averaged over time and antennas is shown in FIG. 2B. All taps below a certain threshold, which is e.g. defined by a combination of noise level, interference level and a certain margin, or by the sensitivity level of the receiver in the user equipment 30, are deleted in order to avoid wasting feedback resources for noisy taps. In FIG. 2B, the threshold is indicated by a dashed line. Preferably, in the tap assignment, a certain minimum distance between selected taps is kept which is in the range of the sampling rate.

For the time intervals in which the amplitude of the channel impulse response that has been averaged over time and antennas is higher than the certain threshold, i.e. for the taps, the complex coefficients of the channel impulse response are determined for each antenna-to-antenna-link. Preferably, the channel impulse response is time-averaged for each antenna-to-antenna-link before determination of the complex coefficients in the time intervals. In other words, the complex coefficients are taken at the delays of the assigned taps from instantaneous channel impulse responses for each antenna-to-antenna-link.

As shown in FIG. 2C, the amplitudes of the complex coefficients of the taps, i.e. of the channel impulse response in the time intervals, are depicted for each antenna-to-antenna sub-channel over the time.

Coefficient Arrangement

The channel matrix H, as seen at the $n^{th}$ receive antenna can be defined as follows:

$$H_n(t) = \begin{bmatrix} h_{1n}(t-\delta_1^1) & \cdots & h_{1n}(t-\delta_L^1) \\ \vdots & \ddots & \vdots \\ h_{Mn}(t-\delta_1^M) & \cdots & h_{Mn}(t-\delta_L^M) \end{bmatrix} = [h_n^1(t), \ldots, h_n^L(t)]$$

In one embodiment, the channel matrix can be organized as follows to capture both transmit and receive correlation:

$$H(t) = \begin{bmatrix} h_1^1(t) & \cdots & h_1^L(t) \\ \vdots & \ddots & \vdots \\ h_N^1(t) & \cdots & h_N^L(t) \end{bmatrix} = [h_1(t), \ldots, h_L(t)]$$

$\overline{H}(t)$ may be defined from H(t) by normalizing the columns by their 2-norm:

$$\overline{H}(t) = \left[ \frac{h_1(t)}{\|h_1(t)\|_2}, \ldots, \frac{h_L(t)}{\|h_L(t)\|_2} \right] = [\overline{h}_1(t), \ldots, \overline{h}_L(t)]$$

A vector-quantisation approach is used to feedback $[\overline{h}_1(t), \ldots, \overline{h}_L(t)]$, while a scalar quantisation approach may be used to feedback $\|h_t(t)\|_2$, $t=1, \ldots L$.

It will be appreciated that vector quantisation can be applied to any suitable vector from the channel representation. The embodiment above applies vector quantisation to the concatenation of the link vectors at each tap. However, other embodiments may apply vector quantisation to the individual vectors for each receive antenna at each tap independently, or for each transmit antenna at each tap independently, or for the vector of coefficients corresponding to the taps of one or more links.

Vector Quantisation

A different quantisation codebook can be built for each column of the normalized channel matrix $\bar{H}(t)$. $C_i$, i=1, . . . L is the codebook associated to $\bar{h}_i(t)$. In general, each codebook can have a different size, such that a different resolution is used to quantise the different paths. For example a larger number of bits could be used for quantising the dominant paths. Both the base station 20 and the user equipment 30 share the same codebooks. In one embodiment, the base station 20 is operable to transmit codebooks to the user equipment 30 for storage therein.

The number of bits used for the $i^{th}$ codebook is denoted as follows:

$$b_i = \log_2|C_i|$$

and the following constraint on the total number of bits for signalling all the columns of $\bar{H}(t)$ is used:

$$\sum_{i=1}^{L} b_i = b$$

It will be appreciated that $C_i$, i=1, . . . , L and $b_i$, i=1, . . . , L can be optimised following a given criterion. Successive refinement of the quantisation in time using hierarchical quantisation is used as will now be described.

Feedback of the Channel Directions—$[\bar{h}_1(t), \ldots, \bar{h}_L(t)]$

The hierarchical feedback approach assumes that if the channel is changing sufficiently slowly the feedback can be aggregated over multiple feedback intervals so that the aggregated bits index a larger codebook.

Figure 3:
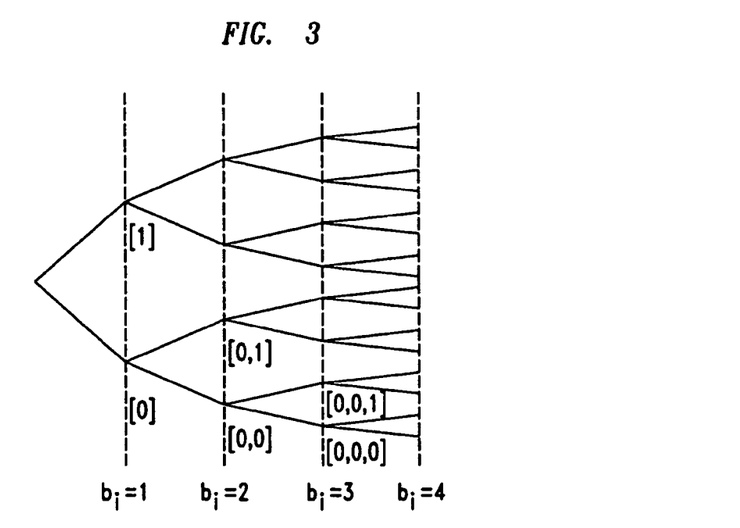
FIG. 3 illustrates an example hierarchical codebook structure.

As it can be seen in FIG. 3, each quantisation codebook can be organized using a binary tree structure, in a way that all the codewords at the $j^{th}$ level have the same j−1 significant bits. Such a structure can be used as an enabler for hierarchical quantisation.

The hierarchical quantisation method can be explained referring to two messages, the basic feedback message and the refined feedback message. The basic feedback message is obtained by sending back to the base station 20 $b_i$ bits specifying the best quantisation codeword at level $b_i$ of the binary tree, typically by specifying its index. The refined feedback message is obtained as follows. Assuming that at the time interval t−1, in one embodiment, both the base station 20 and user equipment 30 share a codeword $\bar{h}_i(t-1) \in C_i$ belonging to the l(t−1)>$b_i$ level. It will be appreciated that the base station 20 and user equipment 30 need to save the sequence of selected codewords, starting from the level $b_i$, up to level l(t−1)). The case l(t−1)=$b_i$ can be obtained as a particular case, where an 'UP' move corresponds to a new codeword in the $b_i$ level.

If c=$\bar{h}_i(t-1)$, then a new candidate is chosen in the l(t−1)+$b_i$−1 level, b-hd i−1 bits are sent back to the base station 20 indicating the position in the subtree starting from $\bar{h}_i(t-1)$, while one bit is used to signal a 'DOWN' move within the tree. If c≠$\bar{h}_i(t-1)$, then a new candidate is chosen in the l(t−1)−($b_i$−1) level, $b_i$−1 bits are sent back to the base station 20 indicating the position in the subtree starting from $\bar{h}_i(t-1)$, while one bit is used to signal a 'UP' path within the tree.

Figure 4:
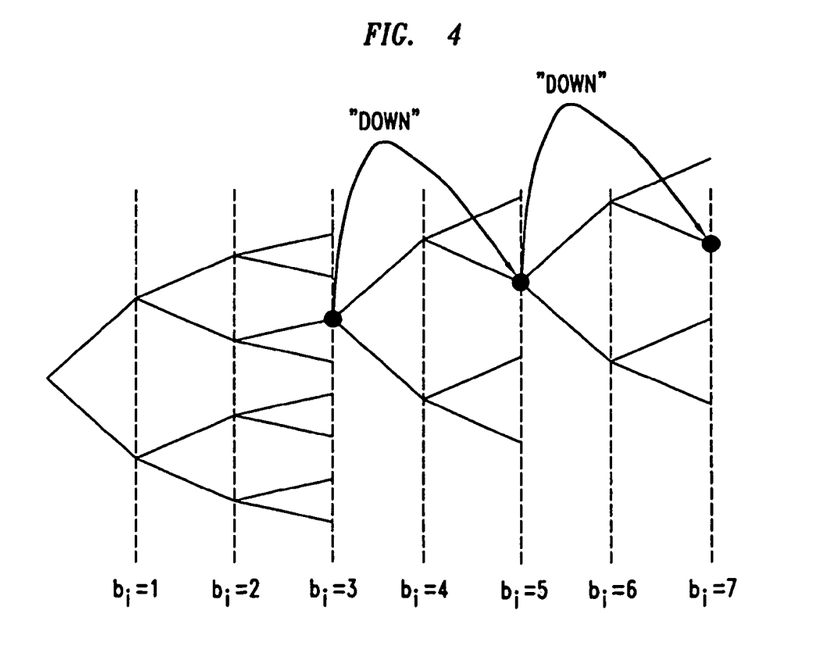
FIGS. 4 and 5 illustrate example utilizations of a hierarchical codebook structure.
Figure 5:
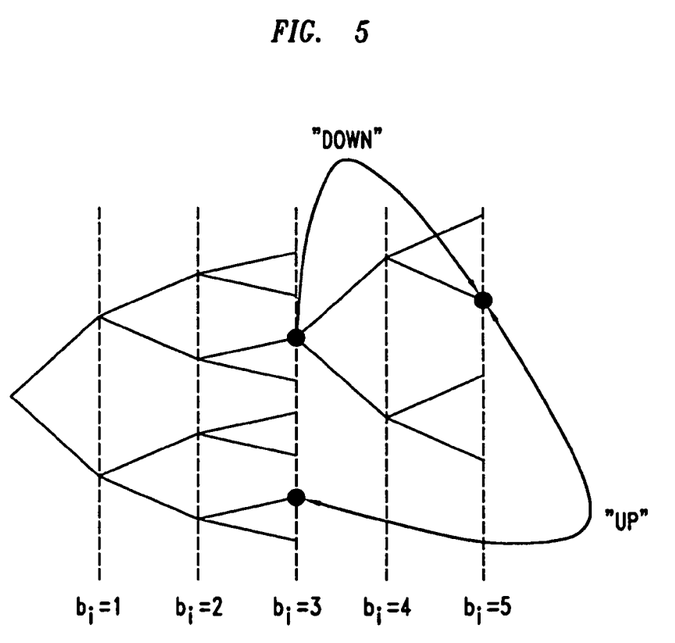

Consider the following two examples shown in FIGS. 4 and 5.

In FIG. 4, at the $i^{th}$ time interval, a refinement ('DOWN') of the quantisation codeword is done starting from l(t−1)=3. A new vector in level 5 is sent back to the base station 20. At the t+1$^{th}$ time interval, a second refinement ('DOWN') is done starting from l(t)=5. A new vector in level 7 is sent back to the base station.

In FIG. 5, at the $l^{th}$ time interval, a refinement ('DOWN') of the quantisation codeword is done starting from l(t−1)=3. A new vector in level 5 is sent back to the base station 20. At the t+1$^{th}$ time interval, due to a channel variation, an 'UP' move is signalled to the base station 20, in the same subtree $\bar{h}_i(t)$ belongs to.

The previously described embodiment using bl−1 bits for signalling the codeword in a given tree level, and 1 bit for signalling an "UP" or "DOWN" move in the tree, can be generalized to the case where xi bits are used for signalling a given codeword in a given tree level, whereas yi bits are used to signal a move in the tree. And these xi,yi can be a function of the level in the tree, user, . . .

Feedback of the channel norms $\|h_i(t)\|_2$, i=1, . . . , L

The scalar $\|h_i(t)\|_2$, i=1, . . . , L can be quantised using a traditional approach for scalar quantisation. It will be appreciated that successive quantisation using hierarchical codebooks can be also applied.

Hence, two approaches for efficient channel state feedback are combined. The first one, is the so-called hierarchical feedback approach, in which the feedback is refined over multiple feedback intervals so that the aggregated bits index a larger codebook. The second one, is the so called time-domain compressed feedback approach. This combined a technique enables successive refinement in different feedback intervals of a compressed time-domain feedback information.

Embodiments provide a method for successive refinement of feedback (from a secondary station to a primary station) of a time-domain representation of the radio channel between a primary station and a secondary station, applicable to one or more antennas at each of the primary and secondary stations.

The embodiments recognise that the accuracy of the channel state information feedback can be improved over time by feeding back hierarchical refinements of the previously fed-back time-domain representation of the channel state information.

Embodiments therefore provide a method by which a time-domain representation of the channel state information can be successively refined by means of a hierarchical quantisation of the time-domain representation.

In one embodiment, the steps of the method comprise, at the secondary station:

1. constructing a time-domain representation of the radio channel from the M primary station antennas to the N secondary station antennas (where M≥1 and N≥1).

2. collecting the elements of the time-domain representation into one or more vectors.

3. quantising the or each vector according to a first predetermined quantisation codebook comprising a first level of a hierarchical codebook.

4. signalling the quantised vector(s) to the primary station.

5. refining the quantisation of at least one vector according to a second predetermined quantisation codebook comprising a second level of the hierarchical codebook.

6. signalling the refined quantisation of the at least one vector to the primary station.

The step of collecting the elements of the time-domain representation into one or more vectors may be performed in a variety of ways in different embodiments. In one embodiment, each vector to be quantised is the 1×M vector of link coefficients for the $n^{th}$ receive antenna at the $i^{th}$ channel tap. In another embodiment, each vector to be quantised is the 1×N vector of link coefficients for the $m^{th}$ transmit antenna at the $i^{th}$ channel tap. In another embodiment, each vector to be quantised is the concatenation of N, 1×M vectors of link coefficients for the $n^{th}$ receive antenna at the $i^{th}$ channel tap. In another embodiment, each vector to be quantised is the concatenation of M, 1×N vectors of link coefficients for the $m^{th}$ transmit antenna at the $i^{th}$ channel tap. In another embodiment, each vector to be quantised is the 1×L vector of link coefficients for the $n^{th}$ receive antenna and $m^{th}$ transmit antenna. In another embodiment, each vector to be quantised is another concatenation or partial concatenation of one or more of the above.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of providing channel state information for a wireless communications channel provided between a first network node having at least M transmission antennas and a second network node having at least N reception antennas, the method comprising:

determining characteristics of each of a plurality of taps resolvable in the time domain of at least one sub-channel within the channel from signals received by the at least N reception antennas over the channel from the at least M transmission antennas;

arranging a set of the characteristics of each of the plurality of taps into at least one vector;

quantizing the at least one vector in which a set of the characteristics of each of the plurality of taps are arranged by selecting one of a plurality of codebook vectors at a first level of a hierarchical codebook of vectors; and providing, to the first network node, an indication of an index to the one of a plurality of codebook vectors, wherein the determining further comprises:

determining characteristics of L taps resolvable in the time domain of each sub-channel within the channel from signals received by the at least N reception antennas over the channel from the at least M transmission antennas, where L is a positive integer.

2. The method of claim 1, wherein the quantizing comprises:

quantizing the at least one vector by selecting, for each vector, one of a plurality of codebook vectors at a first level from one of a plurality of hierarchical codebooks of vectors.

3. The method of claim 1, further comprising:

requantizing the at least one vector by selecting one of a plurality of hierarchically-related codebook vectors from hierarchically-related levels of the hierarchical codebook of vectors; and providing, to the first network node, an indication of an index to the one of a plurality of hierarchically-related codebook vectors.

4. The method of claim 3, wherein the one of a plurality of hierarchically-related codebook vectors from hierarchically-related levels of the hierarchical codebook of vectors comprises one of a plurality of child codebook vectors from child levels of the hierarchical codebook.

5. The method of claim 3, wherein the one of a plurality of hierarchically-related codebook vectors from hierarchically-related levels of the hierarchical codebook of vectors comprises one of a plurality of parent codebook vectors from parent levels of the hierarchical codebook.

6. The method of claim 1, further comprising:

pre-processing the at least one vector prior to the quantizing.

7. The method of claim 6, wherein the pre-processing comprises quantizing at least one scalar value produced by the normalizing and providing, to the first network node, an indication of the at least one scalar.

8. The method of claim 1, wherein the arranging further comprises:
arranging the characteristics of the L taps resolvable in the time domain of each sub-channel within the channel into vectors of characteristics for each of the at least N reception antennas at each tap.

9. The method of claim 1, wherein the arranging further comprises:
arranging the characteristics of the L taps resolvable in the time domain of each sub-channel within the channel into vectors of characteristics for each of the at least M transmission antennas at each tap.

10. The method of claim 1, wherein the arranging further comprises:
arranging the characteristics of the L taps resolvable in the time domain of each sub-channel within the channel into a concatenation of vectors of characteristics for each reception antenna at each tap.

11. The method of claim 1, wherein the arranging further comprises:
arranging the characteristics of the L taps resolvable in the time domain of each sub-channel within the channel into a concatenation of vectors of characteristics for each transmission antenna at each tap.

12. The method of claim 1, wherein the arranging further comprises:
arranging the characteristics of the L taps resolvable in the time domain of each sub-channel within the channel into vectors of characteristics for each of the at least M transmission antennas and each of the at least N reception antennas, each vector having a dimension of 1×L.

13. A method implemented by a non-transitory computer readable storage medium, in which a program is saved, the program comprising instructions which, when they are executed in a programmable device, cause the provision of channel state information for a wireless communications channel between a first network node having at least M transmission antennas and a second network node having at least N reception antennas, the method, comprising:
determining characteristics of each of a plurality of taps resolvable in the time domain of at least one sub-channel within the channel from signals received by the at least N reception antennas over the channel from the at least M transmission antennas;
arranging a set of the characteristics of each of the plurality of taps into at least one vector;
quantizing the at least one vector in which a set of the characteristics of each of the plurality of taps are arranged by selecting one of a plurality of codebook vectors at a first level of a hierarchical codebook of vectors; and
providing, to the first network node, an indication of an index to the one of a plurality of codebook vectors,
wherein the determining further comprises:
determining characteristics of L taps resolvable in the time domain of each sub-channel within the channel from signals received by the at least N reception antennas over the channel from the at least M transmission antennas, where L is a positive integer.

14. A first network node having at least N reception antennas and operable to provide channel state information for a wireless communications channel provided between second network node having at least M transmission antennas and the first network node, the network node comprising:
determination logic operable to determine characteristics of each of a plurality of taps resolvable in the time domain of at least one sub-channel within the channel from signals received by the at least N reception antennas over the channel from the at least M transmission antennas;
arrangement logic operable to arrange the characteristics of each of the plurality of taps into at least one vector;
quantization logic operable to quantize the at least one vector in which a set of the characteristics of each of the plurality of taps are arranged by selecting one of a plurality of codebook vectors at a first level of a hierarchical codebook of vectors; and
provision logic operable to provide, to the another network node, an indication of an index to the one of a plurality of codebook vectors,
wherein the determining further comprises:
determining characteristics of L taps resolvable in the time domain of each sub-channel within the channel from signals received by the at least N reception antennas over the channel from the at least M transmission antennas, where L is a positive integer.

15. The method of claim 1, wherein at least one of M and N is an integer value greater than 1.

16. The method of claim 13, wherein at least one of M and N is an integer value greater than 1.

17. The network node of claim 14, wherein at least one of M and N is an integer value greater than 1.

* * * * *